United States Patent
Ganadas et al.

(10) Patent No.: US 10,976,820 B2
(45) Date of Patent: Apr. 13, 2021

(54) NATURAL INTERACTIONS WITH VIRTUAL OBJECTS AND DATA THROUGH TOUCH

(71) Applicant: Microsoft Technology Licensing, LLC, Redmond, WA (US)

(72) Inventors: Priya Ganadas, Seattle, WA (US); Kenneth Liam Kiemele, Redmond, WA (US); Christian Michael Sadak, Seattle, WA (US); Adolfo Hernandez Santisteban, Bothell, WA (US); Scott Christopher Speirs, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 16/033,568

(22) Filed: Jul. 12, 2018

(65) Prior Publication Data
US 2020/0019245 A1    Jan. 16, 2020

(51) Int. Cl.
    *G06F 3/01* (2006.01)
(52) U.S. Cl.
    CPC .............. *G06F 3/016* (2013.01); *G06F 3/014* (2013.01)
(58) Field of Classification Search
    None
    See application file for complete search history.

(56) References Cited

U.S. PATENT DOCUMENTS

| | | | |
|---|---|---|---|
| 6,614,422 B1* | 9/2003 | Rafii | G06F 1/1626 345/156 |
| 8,378,979 B2 | 2/2013 | Frid et al. | |
| 9,645,644 B2 | 5/2017 | Kim | |
| 10,191,546 B2* | 1/2019 | Gervais | G06F 3/016 |
| 2008/0059131 A1 | 3/2008 | Tokita et al. | |
| 2009/0289779 A1* | 11/2009 | Braun | G06F 3/016 340/407.2 |
| 2012/0028577 A1 | 2/2012 | Rodriguez et al. | |
| 2014/0006350 A1* | 1/2014 | Fukui | G06F 16/178 707/632 |
| 2015/0323993 A1* | 11/2015 | Levesque | G02B 27/0172 345/156 |

(Continued)

OTHER PUBLICATIONS

"VR gloves featuring realistic haptic feedback", Retrieved from: https://haptx.com/#glove, Retrieved on: Mar. 23, 2018, 5 Pages.
(Continued)

*Primary Examiner* — Benjamin C Lee
*Assistant Examiner* — Emily J Frank
(74) *Attorney, Agent, or Firm* — Arent Fox LLP

(57) ABSTRACT

Methods and devices for providing a haptic responses to a haptic feedback device may include receiving, by an application providing a virtual environment executing on a computer device, physical movement input based at least on movement of the haptic feedback device that corresponds to a virtual movement interaction with a virtual object in the virtual environment. The methods and devices may include accessing a haptic signature associated with the virtual object. The methods and devices may include determining a haptic response based at least upon the haptic signature to identify the virtual object through the haptic response. The methods and devices may include transmitting the haptic response to the haptic feedback device.

20 Claims, 7 Drawing Sheets

(56) References Cited

U.S. PATENT DOCUMENTS

| | | | |
|---|---|---|---|
| 2016/0179199 A1* | 6/2016 | Levesque | G06F 3/014 340/407.2 |
| 2016/0189427 A1* | 6/2016 | Wu | G06F 3/016 345/633 |
| 2016/0274662 A1* | 9/2016 | Rimon | G06F 3/016 |
| 2016/0296838 A1 | 10/2016 | Goetgeluk et al. | |
| 2016/0363997 A1 | 12/2016 | Black et al. | |
| 2017/0115733 A1* | 4/2017 | Du | G06F 3/0416 |
| 2017/0168565 A1* | 6/2017 | Cohen | A61B 5/0022 |
| 2017/0168576 A1* | 6/2017 | Keller | G06F 3/016 |
| 2017/0185151 A1 | 6/2017 | Pahud et al. | |
| 2018/0144549 A1 | 5/2018 | Gonzalez et al. | |
| 2018/0189567 A1* | 7/2018 | Maheriya | G06K 9/00214 |
| 2019/0163266 A1* | 5/2019 | Johnson | G06F 3/011 |
| 2019/0265781 A1* | 8/2019 | Kehoe | G06F 1/1686 |

OTHER PUBLICATIONS

Hutson, Matthew, "Finger devices let users 'touch' virtual objects", Retrieved from: http://www.sciencemag.org/news/2017/04/finger-devices-let-users-touch-virtual-objects, Apr. 25, 2017, 8 Pages.

Mansor, et al., "Concept and application of virtual reality haptic technology: a review", In Journal of Theoretical and Applied Information Technology, vol. 95, No. 14, Jul. 31, 2017, pp. 3320-3336.

"International Search Report and Written Opinion Issued in PCT Application No. PCT/US19/037829", dated Sep. 5, 2019, 12 Pages.

\* cited by examiner

NATURAL INTERACTIONS WITH VIRTUAL OBJECTS AND DATA THROUGH TOUCH

BACKGROUND

The present disclosure relates to computer graphics systems, and more particularly, to virtual environments.

Interactions with virtual objects in mixed reality and/or virtual reality environments may lack immersion. Individuals perceive experiences through all five senses in the natural world. Most of these experiences are visually led, resulting in a perception gap when interacting in virtual environments. For example, since most interactions in virtual environments are visual, users have to solely rely on visual cues to access information. Moreover, interactions with virtual environments may need specialized controllers which have limited interaction abilities. For example, previous solutions that replicate some of the interactivity include virtual environment hand controllers that users hold in their hands. These controllers need to be grasped and hence limit the ability to allow gestures and natural interactions.

Thus, there is a need in the art for improvements in interactions with virtual environments.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory, the processor, and an application providing a virtual environment. The application may be operable to receive physical movement input based at least on movement of the haptic feedback device that corresponds to a virtual movement interaction with a virtual object in the virtual environment; access a haptic signature associated with the virtual object; determine a haptic response based at least upon the haptic signature to identify the virtual object through the haptic response; and transmit the haptic response to the haptic feedback device.

Another example implementation relates to a method for providing a haptic responses to a haptic feedback device. The method may include receiving, by an application providing a virtual environment executing on a computer device, physical movement input based at least on movement of the haptic feedback device that corresponds to a virtual movement interaction with a virtual object in the virtual environment. The method may include accessing a haptic signature associated with the virtual object. The method may include determining a haptic response based at least upon the haptic signature to identify the virtual object through the haptic response. The method may include transmitting the haptic response to the haptic feedback device.

Another example implementation relates to computer-readable medium storing instructions executable by a computer device. The computer-readable medium may include at least one instruction for causing the computer device to receive physical movement input based at least on movement of the haptic feedback device that corresponds to a virtual movement interaction with a virtual object in the virtual environment. The computer-readable medium may include at least one instruction for causing the computer device to access a haptic signature associated with the virtual object. The computer-readable medium may include at least one instruction for causing the computer device to determine a haptic response based at least upon the haptic signature to identify the virtual object through the haptic response. The computer-readable medium may include at least one instruction for causing the computer device to transmit the haptic response to the haptic feedback device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
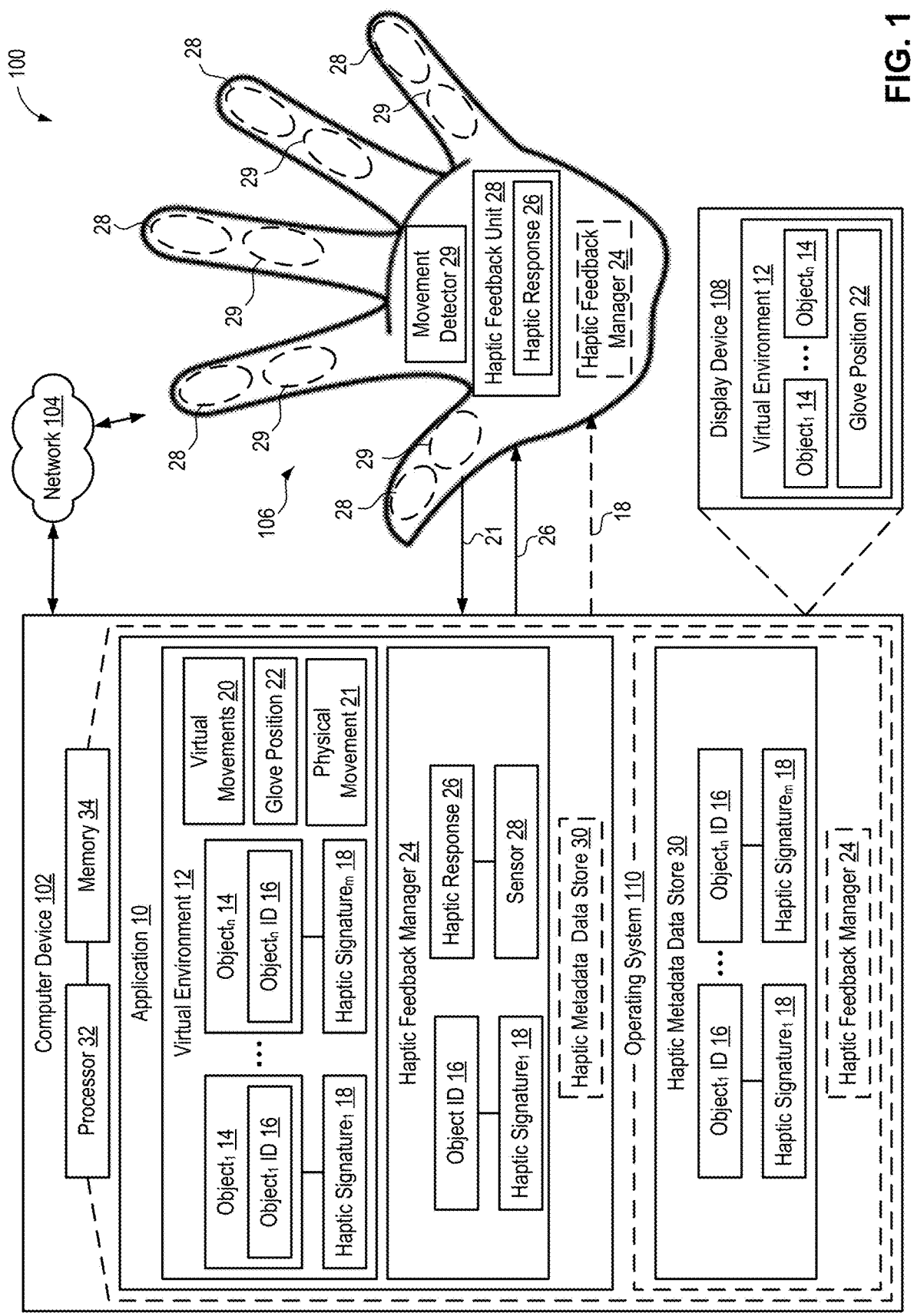
FIG. 1 is a schematic block diagram of an example computer device in accordance with an implementation of the present disclosure.

This disclosure relates to devices and methods for using haptic feedback devices to provide natural interactions with a virtual environment. A user may interact with the virtual environment, for example, using a VR device or other computer device. As used herein, a VR device may include a device that generates and/or displays virtual reality images (e.g., from at least one virtual or digital environment input), augmented reality (AR) images (e.g., from at least one virtual or digital environment input and one real or physical environment input), and/or mixed reality (MR) images (or hybrid reality, e.g., a mix of a real or physical environment input and VR input, and encompassing AR and augmented virtually). Since most interactions in VR, AR, and/or MR may be visual, users typically have had to rely on visual cues to access information. By using haptic feedback devices, the devices and methods may broaden the mode of delivering information to a user interacting with virtual objects.

The haptic feedback devices may provide tactile and/or other sensory outputs through one or more haptic feedback units on the haptic feedback devices to simulate the sense of touch and provide a fusion of the various senses when interacting with virtual objects. For example, the haptic feedback devices may include, but are not limited to, a haptic glove, controllers, a gamepad, a joystick, keyboard, mouse, or other input devices. As such, a user may receive sound and/or touch signals through the haptic feedback device when interacting with virtual objects in virtual reality and/or mixed reality environments.

The devices and methods may allow a user to directly manipulate and/or touch digital objects in a virtual environment and/or mixed reality environment using the haptic feedback devices. In addition, the devices and methods may also allow a user to identify virtual objects using the haptic feedback devices. For example, virtual objects may have a haptic signature associated with the virtual object. The haptic signature may be any clearly distinguishable signal from a haptic actuator that enables a user to distinguish virtual objects by feel alone. The haptic signature may associate a unique haptic sense to the virtual object, where the unique haptic sense may include, but is not limited to, a sound, an amount of pressure or force, a vibration, a texture, air pressure, a thermal effect, or any combination thereof. As such, when a user touches a virtual object using the haptic feedback device, the haptic signature may be used to simulate the feel of the virtual object and/or otherwise enable a user to identify the virtual object and/or a status and/or attributes of the virtual object.

For example, the haptic signature may enable a user to identify one or more virtual objects without necessarily engaging visually with the virtual object. The user may be able to use the haptic signatures to understand the presence, location, status, and/or actions of digital objects resulting in less visual interactions by the user. As such, the devices and methods may allow the user to interact with the virtual environment in a more natural way.

Referring now to FIG. 1, an example system 100 for use with interacting with virtual environments may include a computer device 102 in communication with one or more haptic feedback devices, such as a haptic glove 106. Computer device 102 may execute at least one application 10 to run a virtual environment 12, which generates and communicates image data for displaying one or more VR images defining the virtual environment 12 on display device 108. Display device 108 may be located on computer device 102 and/or may be in communication with computer device 102. Display device 108 may include, but is not limited to, a head mounted display (HIVID) device, a screen on computer device 102, and/or any other device capable of outputting display frame(s) of the virtual environment 12 for viewing by a user of system 100.

Virtual environment 12 may include a virtual reality simulation (e.g., a virtual reality game), a mixed reality environment, and/or an augmented reality environment. In addition, virtual environment 12 may include one or more virtual objects 14 that may be included in the virtual environment 12.

A user may interact with the virtual environment 12 using one or more haptic feedback devices, such as but not limited to haptic gloves 106, in communication with computer device 102 via network 104 and/or through a wired or wireless connection. The haptic gloves 106 may provide detect physical movement 21 of a user, e.g., movement of a hand or one or more fingers, through one or more movement detectors 29 on the haptic gloves 106 and may provide an input of an amount of physical movement 21 of the user to the computer device 102. For example, movement detectors 29 may include flex sensors that detect hand articulation, cameras, inertial measurement units (IMUs), and/or other sensors that allow the haptic gloves 106 to determine where each fingertip is located and/or hand articulation.

When the physical movement 21 of the user is within an area of detection by the computer device 102, such as within a field of view of a head mounted display (HMD), computer device 102 may track the physical movement 21 of the user. For example, the head mounted display may have an optical tracking system that may determine the hand positions and/or physical movements 21 of the haptic gloves 106 in the virtual environment 12. In addition, the haptic gloves 106 may include constellation tracking on the haptic gloves 106 which may use one or more cameras on the head mounted display to localize the haptic gloves 106 in the virtual environment 12 relative to the head mounted display. Another example may include using optical simultaneous localization and mapping (SLAM) tracking or LIDAR and slam tracking to determine the position and/or physical movement 21 of the haptic gloves 106 within the virtual environment 12. For example, small cameras on the haptic gloves 106 may be used for the optical SLAM tracking. Another example may include computer device 102 using magnetic tracking to determine the physical movement 21 and/or location of the haptic gloves 106 within the virtual environment 12. Another example may include using depth cameras on the computer device 102 to determine hand articulation and/or other physical movements 21 of the haptic gloves 106. In particular, in some cases, the physical movement 21 may be outside of an area of detection by the computer device 102, such as outside of a field of view of a head mounted display (HIVID) or near eye device (NED) that may be embodied by one implementation of the computer device 102.

The physical movement 21 of the user may correspond to virtual movements 20 in the virtual environment 12. As such, the virtual movements 20 displayed in virtual environment 12 may correspond to the received physical movement 21 from one or more haptic gloves 106. The haptic feedback device may not be limited to glove 106, but also may include, but is not limited to, controllers, a gamepad, a joystick, keyboard, mouse, or other input device that may provide physical movement 21 input that may correspond to virtual movements 20 in the virtual environment 12. In some cases, the haptic feedback device such as the haptic glove 106 may include a processor and a memory executing instructions to perform the position sensing and feedback generating actions described herein, while in other cases the computer device 102 may fully or completely control the haptic feedback device.

The haptic gloves 106 may allow a user to directly manipulate and/or touch objects 14 in virtual environment 12, point at objects 14 in virtual environment 12, and/or select objects 14 in virtual environment 12. Display device 108 may display a glove position 22 corresponding to a position of the haptic glove 106 within the virtual environment 12. For example, such current glove positions 22 may be in a local coordinate system associated with the computer device 102 and/or a positional tracking system on computer device 102 or in communication with computer device 102. In some cases, such a local coordinate system may correspond to or be the same as a global coordinate system, such as with a geographic positioning system. As such, a user may see the glove positions 22 within the virtual environment 12 and may move the haptic gloves 106 to directly manipulate and/or touch objects 14 in virtual environment 12.

In addition, the haptic gloves 106 may provide one or more haptic responses 26 through one or more haptic feedback units 28 on the haptic gloves 106 to simulate the sense of touch. Each haptic glove 106 may have one or more haptic feedback units 28, such as in locations on the glove 106 where sensory feedback may help a user to identify an object or status or attribute thereof. For example, each haptic glove 106 may include, but is not limited to, haptic feedback units 28 on the finger and thumb areas of the glove 106, and optionally on the palm area and/or the back area. Examples of the haptic feedback unit 28 may include, but are not limited to, one or any combination of an eccentric rotating mass actuator, a linear resonant actuator, a piezoelectric actuator, a force feedback device, a speaker, a voice coil actuator, an air vortex ring, an ultrasonic device, or any device adapted to generate force feedback, vibrotactile feedback, or electrotactile feedback, ultrasound tactile feedback, and/or thermal feedback, which can then by applied to at least a portion of a hand or finger of a user when wearing the glove. For instance, the haptic response 26 may include, but is not limited to, one or any combination of sound, tactile, and/or other sensory outputs that may provide a fusion of one or more senses when interacting with virtual objects 14. The haptic responses 26 may intensify when a user holds a virtual object 14 tighter and may lessen as a user relaxes a grip on a virtual object 14. For example, as discussed in more detail below, the one or more haptic responses 26 may include a unique haptic signature 18 associated with an object adapted to enable a user to identify the object and/or a status and/or attributes of the object. As such, a user may receive sound and/or touch signals through one or more haptic feedback units 28 on the haptic gloves 106 when interacting with virtual objects 14 in the virtual environment 12. Interacting with virtual objects 14 may include, but is not limited to, touching a virtual object 14, selecting a virtual object 14, and/or pointing at a virtual object 14.

In an implementation, the haptic gloves 106 may be in communication with a plurality of computer devices 102. A user may use the haptic gloves 106 to interact with virtual environments 12 executing on different computer devices 102. For example, the user may move virtual objects 14 from one virtual environment 12 executing on computer device 102 to another virtual environment 12 executing on a different computer device 102 using the haptic gloves 106. In addition, a plurality of haptic gloves 106 may be in communication with computer device 102. For example, a plurality of users may interact with the same virtual environment 12 using different haptic gloves 106.

The haptic gloves 106 may also be used by a user to identify virtual objects 14 in virtual environment 12. For example, each virtual object 14 may have a haptic signature 18 associated with the virtual object 14. The haptic signature 18 may associate a unique haptic sense, e.g., a sensory output detectable by the user, to the virtual objects 14. For example, the haptic signature 18 h may include, but is not limited to, a sound an object makes, an amount of force or pressure to generate as feedback when a user touches the object, a texture of the object, a vibration, a temperature, air pressure, or any combination thereof. In other words, the haptic signature 18 may be defined by a unique cutaneous receptor model adapted to generate one or a combination of stimuli that can be sensed by the user wearing the haptic glove 106, and in some cases enables the user to identify the virtual object and/or virtual object attributes and/or a virtual object status. As such, when a user touches a virtual object 14 using the haptic gloves 106, the haptic signature 18 may be used to determine the corresponding haptic response 26 to provide to the haptic feedback units 28 in order to simulate the feel of the virtual object 14. For instance, the haptic signature 18 may provide a certain combination, type, and/or intensity of haptic feedback in one or more of a plurality of haptic feedback units 28 positioned within one or both the haptic gloves 106. Thus, in this configuration of the present solution, including use of the haptic glove 106 having haptic feedback units 28 placed in areas where a user is used to receiving sensory feedback, combined with specific feedback response provided by each haptic feedback unit 28 in each area corresponding to a given object, enables the present solution to provide unique physical feedback when interacting with a virtual object.

One example use case may include at least one haptic glove 106 measuring finger articulation and providing touch feedback that allows a user to flip through files, for example, as if the user was flipping through physical files in a physical file cabinet in the physical world. The haptic responses 26 provided through the haptic feedback units 28 of the haptic gloves 106 may simulate the feeling that the user is flipping through physical files when the user is flipping through virtual files in the virtual environment 12.

Computer device 102 may include an operating system 110 executed by processor 32 and/or memory 34. Memory 34 of computer device 102 may be configured for storing data and/or computer-executable instructions defining and/or associated with operating system 110, and processor 32 may execute such data and/or instructions to instantiate operating system 110. An example of memory 34 can include, but is not limited to, a type of memory usable by a computer, such as random access memory (RAM), read only memory (ROM), tapes, magnetic discs, optical discs, volatile memory, non-volatile memory, and any combination thereof. An example of processor 32 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Application 10 and/or operating system 110 may include a haptic feedback manager 24 operable to determine one or more haptic responses 26 to provide when a user interacts with one or more virtual objects 14 in virtual environment 12. When a user interacts with one or more virtual objects 14, haptic feedback manager 24 may access the haptic signature 18 associated with the object ID 16 of the virtual objects 14 touched by the user using the haptic gloves 106. In some cases, the haptic feedback manager 24 is located on the computer device 102, in some instances as part of the operating system 110 or in other instances as defined by the processor 32 and memory 34, while in other cases it is located on the haptic feedback device such as the haptic glove 106.

A haptic metadata data store 30 may associate the object IDs 16 of the various virtual objects 14 in the virtual environment 12 with one or more haptic signatures 18. Haptic feedback manager 24 may identify the haptic signature(s) 18 associated with the virtual object 14 by using the haptic metadata data store 30. Haptic feedback manager 24 may use the haptic signature 18 to determine the haptic response 26 to provide to haptic feedback units 28 on the haptic glove 106. The haptic signature 18 may identify a texture of the virtual object 14, an amount of pressure to provide when a user touches the virtual object 14, air to apply, a temperature to apply, and/or any sounds to add when the user touches the virtual object 14. As such, haptic feedback manager 24 may use the information provided in the haptic signature 18 to determine the correct haptic response 26 to provide to the user. In some instances the haptic metadata data store 30 is defined as part of the operating system 110 while in other instances it is defined by the processor 32 and memory 34.

For example, when a user reaches out and touches grass in a virtual environment 12 using the haptic gloves 106, haptic feedback manager 24 may access the haptic signature 18 associated with the grass and may use the haptic signature 18 to determine the haptic response 26 to provide to the haptic feedback units 28 on the haptic glove 106 to simulate the texture of the grass and make the user feel as if they are brushing over the blades of grass in the virtual environment 12.

In addition, the haptic signature 18 may be used to identify the virtual objects 14. For example, the unique haptic sense associated with the virtual objects 14 (e.g., the haptic response 26 determined from the haptic signature 18) may identify the virtual object 14 when a user touches the virtual object 14 using the haptic gloves 106. For example, the user may be able to identify the virtual object 14 based on the haptic response 26 provided to the haptic gloves 106 without necessarily engaging visually with the virtual object. As such, the user may be able to use the haptic signatures 18 to understand the presence, location, status, and/or actions of virtual objects 14 resulting in less visual interactions by the user.

One example use case may include a user may be able to locate a set of virtual keys that a user may not be able to visually see located inside a virtual purse by using the haptic signature 18. For example, the when the haptic glove 106 touches the virtual keys, haptic feedback manager 24 may identify the haptic signature 18 associated with the virtual keys and determine the haptic response 26 to provide to one or more haptic feedback units 28 on the haptic glove 106. The haptic response 26 may simulate the feel of keys to the users so that the user may pick up the keys from the purse based on the haptic response 26 without visually locating the keys in the virtual environment.

Another example use case may include a user placing a book outside of their field of view in the virtual environment 12. To pick up the book again, the user may reach out of their field of view and may identify the book using the haptic signature 18 of the book without using visual information. For example, haptic feedback manager 24 may determine the haptic response 26 to provide for the book, which may include the shape of the book as well as a sound to provide when contact is made with the book. Thus, when the user reaches out of their field of view with the haptic gloves 106 and touches the book using the haptic glove 106, the user may be able to identify the book based on the haptic response 26 (e.g., the simulated feel of the book, the shape of the book, and the sound of the contact with the book) and use the haptic response 26 to grab the correct item without using visual information. As such, the simulated feel of the virtual object 14 may be signaled by both the tactile response as well as the audio response so that sound profiles and the haptic signatures 18 may work together to recreate and/or simulate the feel of a digital object.

The haptic signature 18 may also be determined by any number of attributes of a file, including, but not limited to, file name, file type, date of modification, and/or content of the file. The haptic signature 18 may allow the user to identify the document and pick up the document without having to visually look at the document. Moreover, the haptic signature 18 may be used to detect differences between the virtual objects 14 based at least upon different pattern vibrations and/or pressure changes. In addition, users may assign haptic signatures 18 to files to convey a meaning to the user when the user interacts with the file.

For example, a user may need to identify a document in a mixed reality virtual environment 12. The user may reach down and flip through what feels like a rolodex in the virtual environment 12 using the haptic glove 106. Through the simulated touch and feel of the haptic response 26 associated with the document, the user may identify the document the user wants to access based at least upon the haptic signature 18 of the document without looking down for the document.

The haptic signature 18 may also be used to sense a status and/or actions of the virtual objects 14. For example, the haptic signature 18 may be used to signal a virtual object 14 is locked and/or that access may be restricted to the virtual object 14. A locked file may, for example, have a warning buzz, such as, a sawtooth wave, for the haptic signature 18. An unlocked file may, for example, use a soothing sine wave for the haptic signature 18 to show the relative accessibility of the unlocked file. A music file may, for example, have a haptic signature 18 that vibrates with a same waveform as a song. A text document may, for example, have a haptic signature 18 that buzzes the title in Morse code. The haptic signature 18 may also take the letters in the title of a file, turn the letters into notes, and produce a unique set of different frequency vibrations which may play in a loop indicating the file name. In addition, the haptic signature 18 may be used to indicate that a virtual object 14 may not be moved to another location. The haptic signature 18 may also be used to indicate a level of importance of a file. As such, haptic user interaction may be used to detect and/or sense status of files, such as, but not limited to, locked, unlocked, recently updated, unread, and/or level of importance of digital objects in virtual reality and/or mixed reality.

An example use case may include when a user is interacting with a file (e.g., a document, video, photo) in the virtual environment 12, the haptic signature 18 may indicate that the file may not move from one folder to another. As such, the haptic response 26 provided to the haptic feedback units 28 on the haptic glove 106 may cause the user to feel a change of pressure in his hand resulting in a sensation of resistance, preventing the user from moving the file from one folder to another.

Another example may include a user may receive a warning vibration through the haptic gloves 106 when the user does not have access to a file. For example, the haptic signature 18 associated with a file may indicate that the access to the file is restricted. When the user attempts to access the file using haptic glove 106, haptic feedback manager 24 may determine that a warning vibration is the haptic response 26 to provide to haptic feedback units 28. As such, when the user attempts to access the file, the user may receive a warning vibration through the haptic feedback units 28 on the haptic gloves 106.

Another use case may include virtual objects 14, such as, buttons and file folders positioned around the user in the virtual environment 12. The user may be able to feel, locate, detect, interact and/or determine the status of the virtual objects 14 (e.g., locked/not locked) by using only the haptic responses 26 based on the haptic signatures 18 of the virtual objects 14. As a result, the present solution may allow the user to be less screen/display dependent and identify objects without visual information.

The haptic signatures 18 may be automatically accessed from a library of predefined haptic senses to associate with the virtual objects 14. The library of haptic senses may include, but are not limited to, sounds, textures, an amount of pressure to provide, temperatures, and/or other sensory outputs so that a fusion of the various senses may be provided to a user when interacting with virtual objects 14. By using a library of predefined haptic senses, a content provider may have the haptic signatures 18 automatically created so that haptic responses 26 may be provided to a user without the content provider having to create the haptic signatures 18. For example, a content provider may access a haptic signature 18 for a button from the library of haptic senses to use in the virtual environment 12 so that when a user touches buttons in the virtual environment 12 the haptic signature 18 for buttons may be automatically provided in the haptic metadata data store 30 and used by the haptic feedback manager 24 to determine the haptic response 26 to provide for the button.

In addition, the haptic signatures 18 may be created by the content provider to store in the haptic metadata data store 30. For example, a content provider may want a button to have a logo that a user may feel when the user touches the button and have a jingle play when the button is pressed. The content provider may create the haptic signature 18 to include the logo and the jingle for the button. Another example may include a content provider may want to showcase sample fabrics to provide customers a sense of what the clothes may feel like. The content provider may create the haptic signatures 18 when the fabric may be custom designed. Alternatively, the content provider may use the library of haptic signatures 18 to simulate fabric typically used.

The haptic signatures 18 may also be user-defined. User input may be received assigning one or more haptic response characteristics to the haptic signature 18 for one or more virtual objects 14. For example, the user input may assign different haptic effects to the haptic signature 18 to different categories of virtual objects to identify priority labels and/or categorizations for the virtual objects 14. One example use case may include assigning one or more haptic responses as the user labels documents and/or emails so that when the user interacts with the labeled documents and/or emails at a later time, the user receives the assigned haptic responses. The user may also author haptic sensations to include in the haptic signature 18 for one or more virtual objects 14 by combining different waveforms and/or inputs to the haptics.

As such, the haptic signatures 18 stored in the haptic metadata data store 30 may include predefined haptic signatures 18, user-defined haptic signatures 18, haptic signatures 18 created by the content provider of the virtual environment 12, and/or a combination thereof.

In an implementation, haptic feedback manager 24 may be located on the haptic gloves 106. As such, the haptic gloves 106 may receive the haptic signature 18 from application 10 and/or computer device 102 and may determine the haptic response 26 to provide through haptic feedback units 28 based at least upon the received haptic signatures 18.

Thus, the haptic gloves 106 may allow the user to interact with the virtual environment in a natural way by providing haptic responses 26 that may be used to mimic the real world in the virtual environment 12. Moreover, the haptic gloves 106 may provide fusion of the various senses when interacting with virtual objects providing a fuller immersion into the virtual environment 12.

Figure 2:
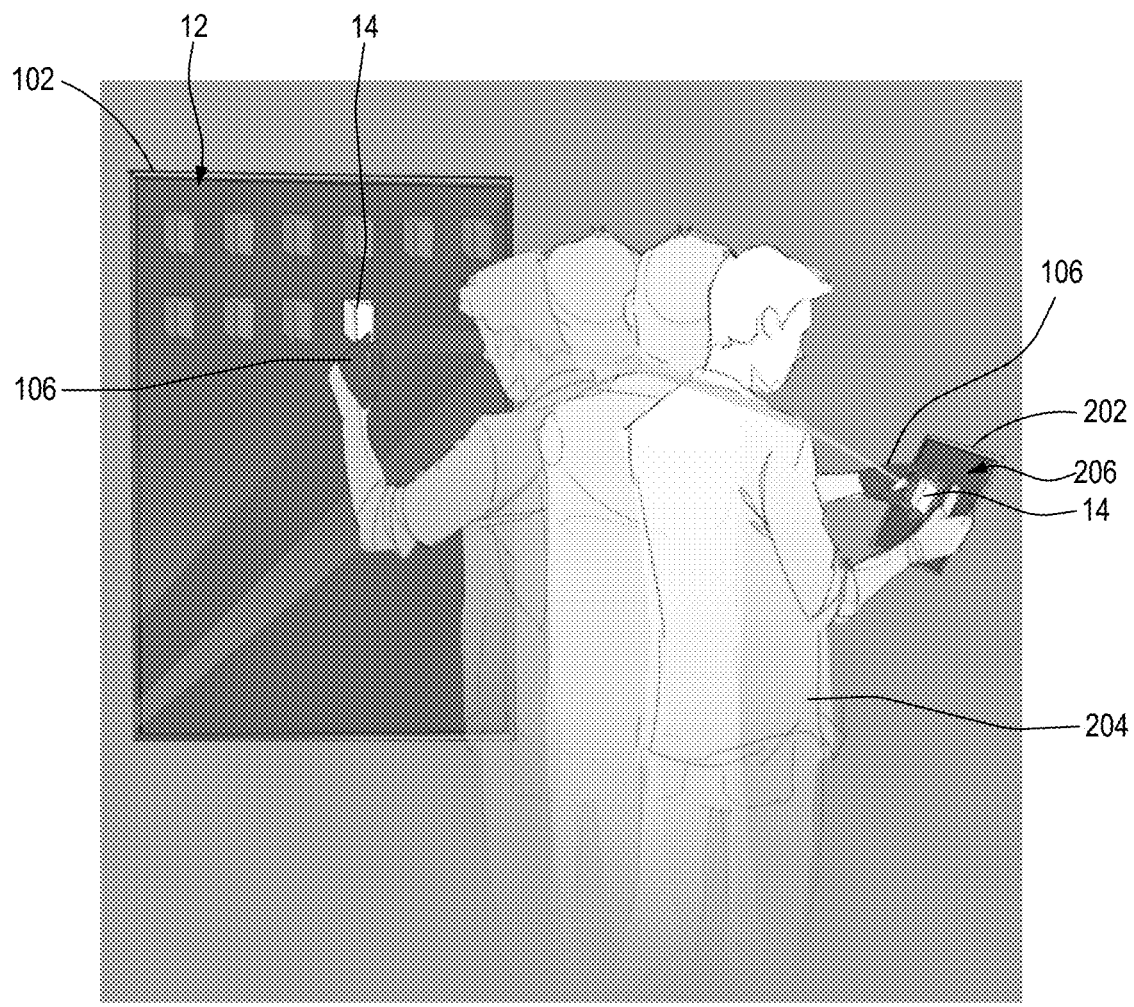
FIG. 2 is a schematic diagram of a plurality of computer devices in communication with a haptic feedback device in accordance with an implementation of the present disclosure.

Referring now to FIG. 2, an example system 200 may include a plurality of computer devices 102, 202 in communication with the haptic gloves 106. A user 204 may have a virtual environment 12 executing on computer device 102 with a plurality of virtual objects 14 that may be accessed in the virtual environment 12. For example, the virtual objects 14 may be various file folders that user 204 may access.

In addition, user 204 may have another computer device 202 with a virtual environment 206 executing on computer device 202. User 204 may use the haptic glove 106 to copy a file 14 from the virtual environment 12 on computer device 102 to the virtual environment 206 on computer device 202. User 204 may use the haptic glove 106 to perform an action associated with a copy function, e.g., pinch the file 14, to copy the file 14 and perform another action associated with pasting, e.g., release the pinch of the file 14, to paste the file 14 in virtual environment 206 on computer device 202. In a further example, the haptic signature 18 (FIG. 1) associated with the file 14 may indicate that the file 14 may be copied and pasted, e.g., moved. As such, when user 204 selects the file using the haptic gloves 106, the file may be transferred and/or copied to the virtual environment 206 on computer device 202.

Thus, the haptic gloves 106 may be used to transfer virtual objects 14 between virtual environments 12, 206 executing on different computer devices 102, 202 in communication with the haptic gloves 106. Moreover, the haptic gloves 106 may be used to interact with the virtual objects 14 in both virtual environments 12, 206.

Figure 3:
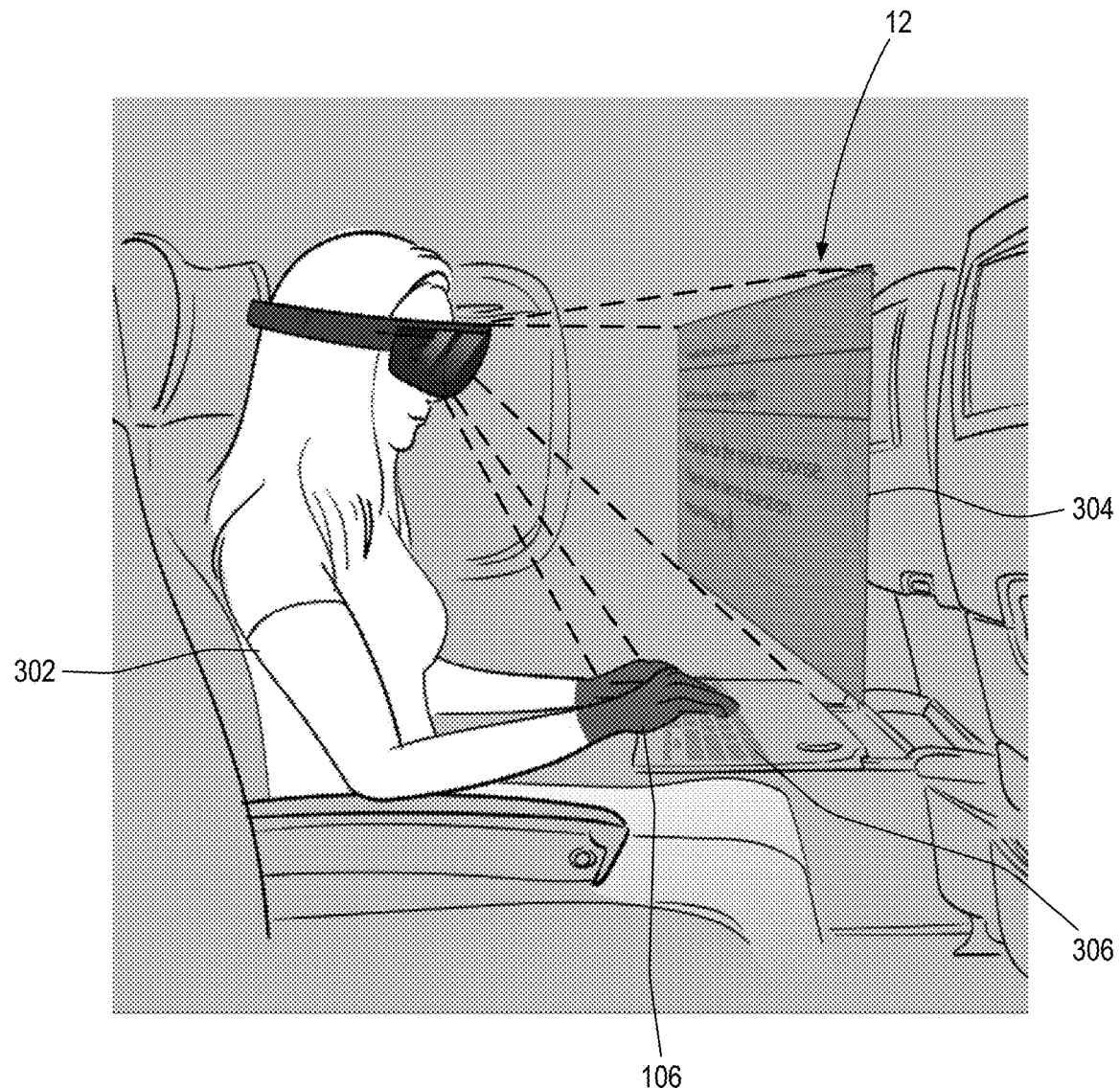
FIG. 3 is a schematic diagram of using a haptic glove in a virtual environment in accordance with an implementation of the present disclosure.

Referring now to FIG. 3, an example of using haptic gloves 106 in a virtual environment 12 may include a virtual computer screen 304 and a virtual keyboard 306 projected in the virtual environment 12. A user 302 may type on the virtual keyboard 306 using the haptic gloves 106. The haptic gloves 106 may provide a haptic response 26 to the user that simulates typing on a real keyboard. As such, user 302 may use the pressure provided through the haptic responses 26 to type on the virtual keyboard 306 in the virtual environment 12.

Figure 4:
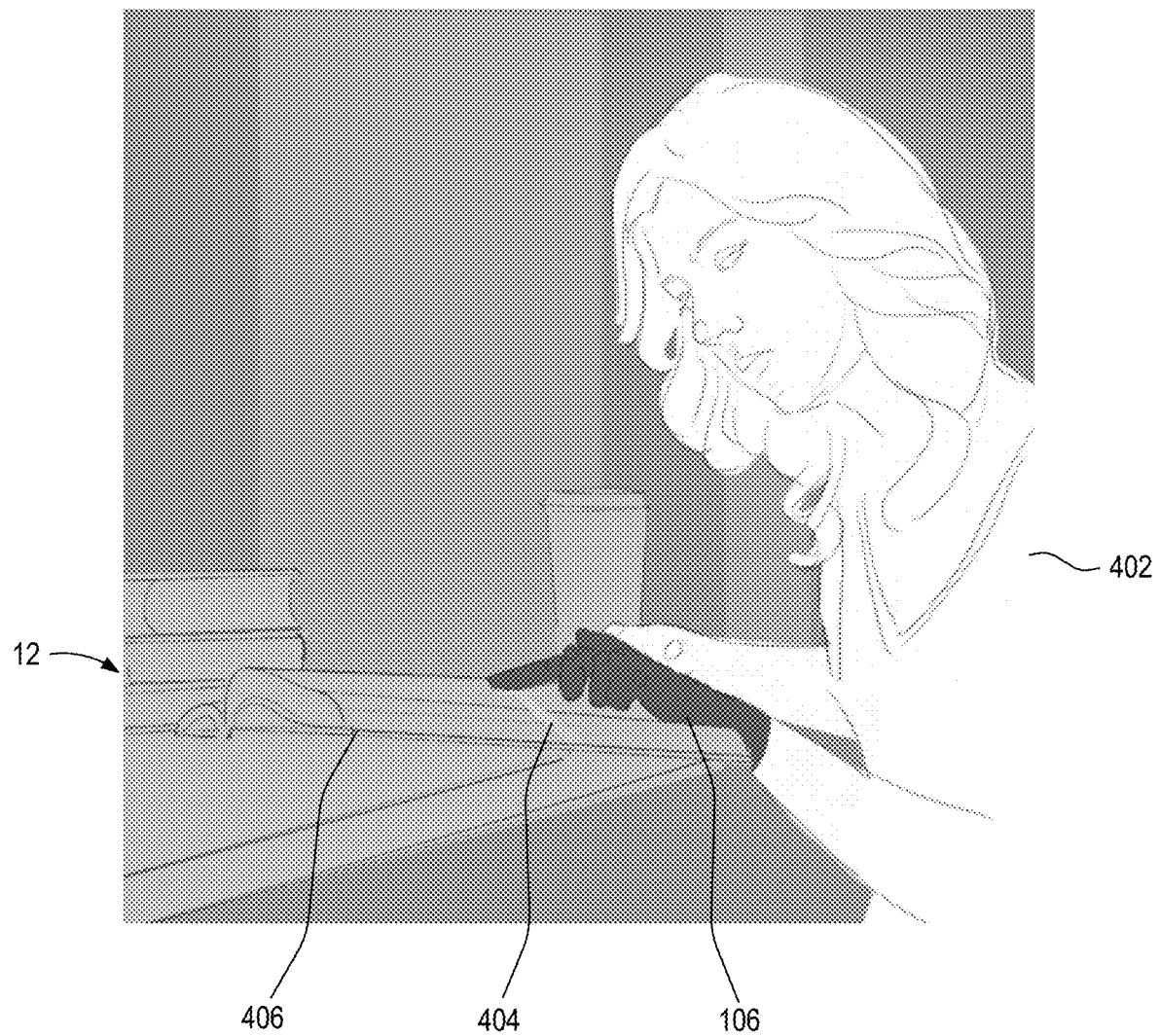
FIG. 4 is a schematic diagram of using a haptic glove to copy content in a virtual environment in accordance with an implementation of the present disclosure.

Referring now to FIG. 4, an example of using haptic gloves 106 in a virtual environment 12 may include a user 402 reading a virtual book 406 in a virtual environment 12. User 402 may want to copy content from the virtual book 406. As such, user 402 may use the haptic glove 106 to highlight 404 the portion of the content that user 402 wants to copy, e.g., such as by moving a finger along or over an area of content (such as a virtual sentence typed in the virtual book 406). As such, the haptic glove 106 may allow user 402 to interact more naturally with virtual objects in the virtual environment 12.

Figure 5:
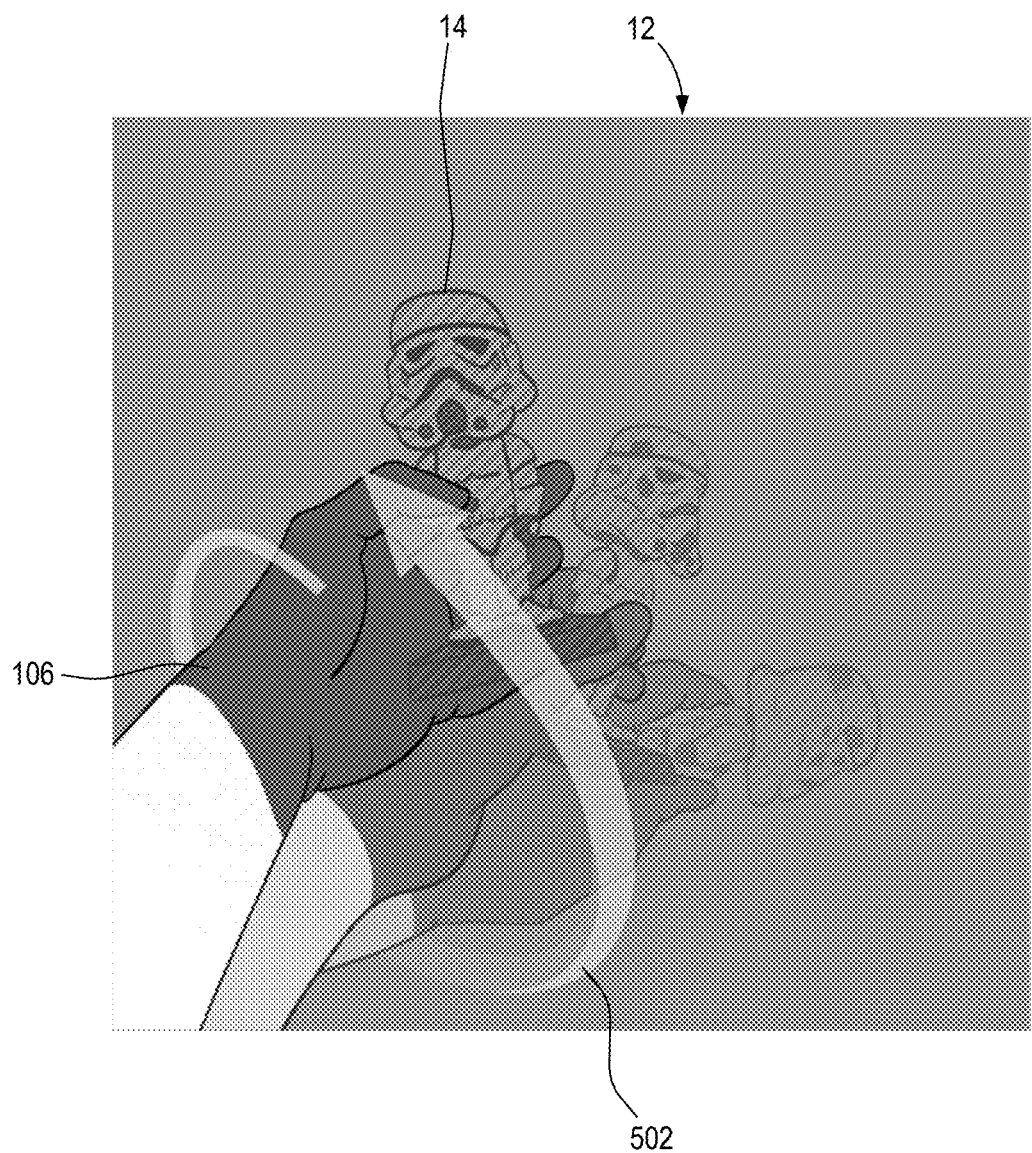
FIG. 5 is a schematic diagram of using a haptic glove to manipulate a virtual object in accordance with an implementation of the present disclosure.

Referring now to FIG. 5, an example of using haptic gloves 106 in a virtual environment 12 may include a user manipulating virtual objects 14 using the haptic glove 106. For example, the user may grab a virtual object 14 and may rotate 502 the virtual object 14 in various directions. The haptic responses 26 may provide the user with the feel of the outer surface, weight, and inertia associated with moving the object 14. Thus, the haptic glove 106 may provide the user the freedom to grab and/or move virtual objects 14 in the virtual environment 12 in a natural way.

Figure 6:
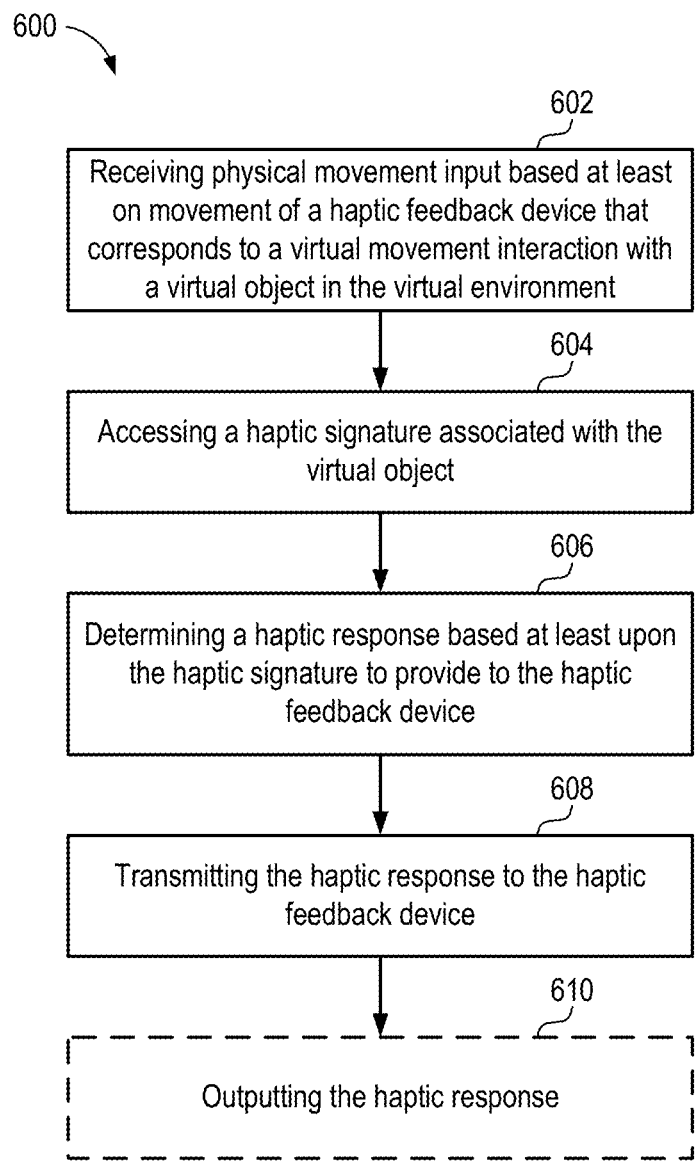
FIG. 6 is an example method flow for providing haptic responses to a haptic feedback device in accordance with an implementation of the present disclosure.

Referring now to FIG. 6, a method flow 600 for providing haptic responses 26 (FIG. 1) to a haptic feedback device for use with application 10 (FIG. 1) by computer device 102 (FIG. 1) is discussed in connection with the description of the architecture of FIG. 1.

At 602, method 600 may include receiving physical movement input based at least on movement of the haptic feedback device that corresponds to a virtual movement interaction with a virtual object in the virtual environment. A user may interact with the virtual environment 12 using one or more haptic feedback devices, such as but not limited to haptic gloves 106, in communication with computer device 102 via network 104 and/or through a wired or wireless connection. The haptic gloves 106 may provide detect physical movement 21 of a user, e.g., movement of a hand or one or more fingers, through one or more movement detectors 29 on the haptic gloves 106 and may provide an input of an amount of physical movement 21 of the user to the computer device 102. For example, movement detectors 29 may include flex sensors that detect hand articulation, cameras, inertial measurement units (IMUs), and/or other sensors that allow the haptic gloves 106 to track hand articulation. The physical movement 21 of the user may correspond to virtual movements 20 in the virtual environment 12 so that when a user moves some part of the haptic gloves 106 to interact with a virtual object 14, the haptic feedback device 106 may be in the same position as a portion of the virtual object 14. Interacting with virtual objects 14 may include, but is not limited to, touching a virtual object 14, selecting a virtual object 14, and/or pointing at a virtual object 14. As such, the virtual movements 20 displayed in virtual environment 12 may correspond to the received physical movement 21 from one or more haptic gloves 106.

When the physical movement 21 of the user is within an area of detection by the computer device 102, such as within a field of view of a head mounted display (HMD), computer device 102 may track the physical movement 21 of the user using one or more cameras. For example, the head mounted display may have an optical tracking system that may determine the hand positions and/or physical movements 21 of the haptic gloves 106 in the virtual environment 12. In addition, the haptic gloves 106 may include constellation tracking on the haptic gloves 106 which may use one or more cameras on the head mounted display to localize the haptic gloves 106 in the virtual environment 12 relative to the head mounted display. Another example may include using optical simultaneous localization and mapping (SLAM) tracking or LIDAR and SLAM tracking to determine the position and/or physical movement 21 of the haptic gloves 106 within the virtual environment 12. For example, small cameras on the haptic gloves 106 may be used for the optical SLAM tracking. Another example may include computer device 102 using magnetic tracking to determine the physical movement 21 and/or location of the haptic gloves 106 within the virtual environment 12. Another example may include using depth cameras on the computer device 102 to determine hand articulation and/or other physical movements 21 of the haptic gloves 106. In particular, in some cases, the physical movement 21 may be outside of an area of detection by the computer device 102, such as outside of a field of view of a head mounted display (HMD) or near eye device (NED) that may be embodied by one implementation of the computer device 102.

The haptic feedback device may not be limited to glove 106, but also may include, but is not limited to, controllers, a gamepad, a joystick, keyboard, mouse, or other input device that may provide physical movement 21 input that may correspond to virtual movements 20 in the virtual environment 12. In some cases, the haptic feedback device such as the haptic glove 106 may include a processor and a memory executing instructions to perform the position sensing and feedback generating actions described herein, while in other cases the computer device 102 may fully or completely control the haptic feedback device.

The haptic gloves 106 may allow a user to directly manipulate and/or touch objects 14 in virtual environment 12, point at objects 14 in virtual environment 12, and/or select objects 14 in virtual environment 12. Display device 108 may display a glove position 22 corresponding to a position of the haptic glove 106 within the virtual environment 12. As such, a user may see the glove positions 22 within the virtual environment 12 and may move the haptic gloves 106 to directly manipulate and/or touch objects 14 in virtual environment 12.

At 604, method 600 may include accessing a haptic signature associated with the object. The haptic gloves 106 may also be used by a user to identify virtual objects 14 in virtual environment 12. For example, each virtual object 14 may have a haptic signature 18 associated with the virtual object 14. The haptic signature 18 may associate a unique haptic sense, e.g., a sensory output detectable by the user, to the virtual objects 14. For example, the haptic signature 18 may include, but is not limited to, a sound an object makes, an amount of force or pressure to generate as feedback when a user touches the object, a texture of the object, a vibration, a temperature, air pressure, or any combination thereof. In other words, the haptic signature 18 may be defined by a unique cutaneous receptor model adapted to generate one or a combination of stimuli that can be sensed by the user wearing the haptic glove 106, and in some cases enables the user to identify the virtual object and/or virtual object attributes and/or a virtual object status.

As such, when a user touches a virtual object 14 using the haptic gloves 106, the haptic signature 18 may be used to determine the corresponding haptic response 26 to provide to the haptic feedback units 28 in order to simulate the feel of the virtual object 14. For instance, the haptic signature 18 may provide a certain combination, type, and/or intensity of haptic feedback in one or more of a plurality of haptic feedback units 28 positioned within one or both the haptic gloves 106. Thus, in this configuration of the present solution, including use of the haptic glove 106 having haptic feedback units 28 placed in areas where a user is used to receiving sensory feedback, combined with specific feedback response provided by each haptic feedback unit 28 in each area corresponding to a given object, enables the present solution to provide unique physical feedback when interacting with a virtual object.

Application 10 and/or operating system 110 may include a haptic feedback manager 24 operable to determine one or more haptic responses 26 to provide when a user interacts with one or more virtual objects 14 in virtual environment 12. When a user interacts with one or more virtual objects 14, haptic feedback manager 24 may access the haptic signature 18 associated with the object ID 16 of the virtual objects 14 touched by the user using the haptic gloves 106. In some cases, the haptic feedback manager 24 is located on the computer device 102, in some instances as part of the operating system 110 or in other instances as defined by the processor 32 and memory 34, while in other cases it is located on the haptic feedback device such as the haptic glove 106.

A haptic metadata data store 30 may associate the object IDs 16 of the various virtual objects 14 in the virtual environment 12 with one or more haptic signatures 18.

Haptic feedback manager 24 may identify the haptic signature(s) 18 associated with the virtual object 14 by using the haptic metadata data store 30. In some instances the haptic metadata data store 30 is defined as part of the operating system 110 while in other instances it is defined by the processor 32 and memory 34.

At 606, method 600 may include determining a haptic response based at least upon the haptic signature to provide to the haptic feedback device. Haptic feedback manager 24 may use the haptic signature 18 to determine the haptic response 26 to provide to haptic feedback units 28 on the haptic glove 106. The haptic signature 18 may identify a texture of the virtual object 14, an amount of pressure to provide when a user touches the virtual object 14, air to apply, a temperature to apply, and/or any sounds to add when the user touches the virtual object 14. As such, haptic feedback manager 24 may use the information provided in the haptic signature 18 to determine the correct haptic response 26 to provide to the user and generate a corresponding electrical haptic response signal to control operation of the one or more haptic feedback units 28 to generate the output to create the desired sensory effect defined by the haptic signature 18.

At 608, method 600 may include transmitting the haptic response to the haptic feedback device. For example, haptic feedback manager 24 may transmit the haptic response signal corresponding to the haptic response 26 to the haptic glove 106.

At 610, method 600 may include outputting the haptic response. For example, the haptic gloves 106 may provide a haptic response 26 through one or more haptic feedback units 28 on the haptic gloves 106 to simulate the sense of touch. For example, the haptic feedback units 28 may output the haptic response 26 corresponding to the haptic response signal and the haptic signature 18 may provide specific feedback response to each unit of the haptic feedback units 28. In addition, the haptic signature 18 may provide different feedback responses to different units of the haptic feedback units 28. Examples of the haptic feedback unit 28 may include, but are not limited to, one or any combination of an eccentric rotating mass actuator, a linear resonant actuator, a piezoelectric actuator, a force feedback device, a speaker, a voice coil actuator, an air vortex ring, an ultrasonic device, or any device adapted to generate force feedback, vibrotactile feedback, or electrotactile feedback, ultrasound tactile feedback, and/or thermal feedback, which can then by applied to at least a portion of a hand or finger of a user when wearing the glove.

The haptic response 26 may include, but is not limited to, one or any combination of sound, tactile, and/or other sensory outputs that may provide a fusion of one or more senses when interacting with virtual objects 14. The haptic responses 26 may intensify when a user holds a virtual object 14 tighter and may lessen as a user relaxes a grip on a virtual object 14. In addition, the one or more haptic responses 26 may include a unique haptic signature 18 associated with an object adapted to enable a user to identify the object and/or a status and/or attributes of the object. As such, a user may receive sound and/or touch signals through one or more haptic feedback units 28 on the haptic gloves 106 when interacting with virtual objects 14 in the virtual environment 12.

As such, method 600 may allow the user to interact with the virtual environment in a natural way by providing haptic responses that may be used to mimic the real world in the virtual environment. Moreover, method 600 may provide fusion of the various senses when interacting with virtual objects providing a fuller immersion into the virtual environment.

Figure 7:
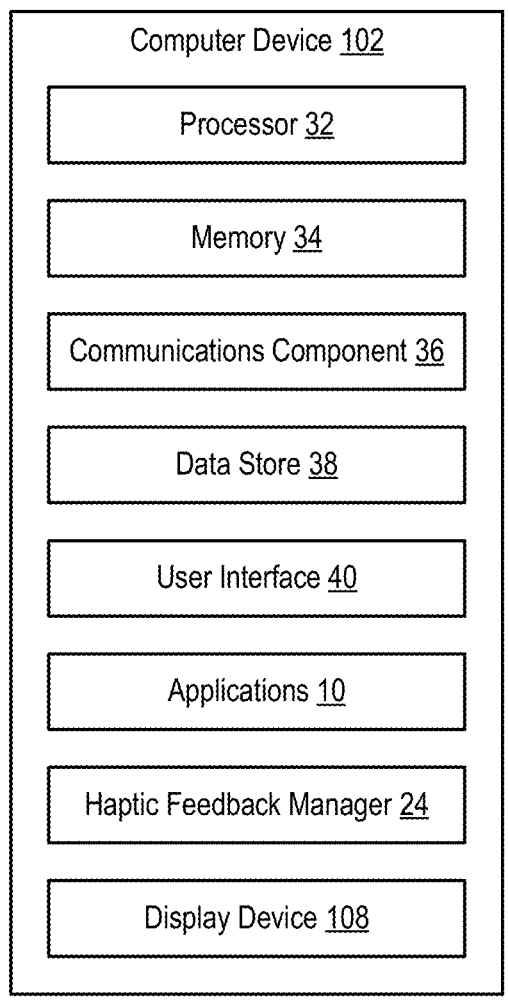
FIG. 7 is a schematic block diagram of an example device in accordance with an implementation of the present disclosure.

Referring now to FIG. 7, illustrated is an example computer device 102 in accordance with an implementation, including additional component details as compared to FIG. 1. In one example, computer device 102 may include processor 32 for carrying out processing functions associated with one or more of components and functions described herein. Processor 32 can include a single or multiple set of processors or multi-core processors. Moreover, processor 32 can be implemented as an integrated processing system and/or a distributed processing system.

Computer device 102 may further include memory 34, such as for storing local versions of applications being executed by processor 32. Memory 34 can include a type of memory usable by a computer, such as random access memory (RAM), read only memory (ROM), tapes, magnetic discs, optical discs, volatile memory, non-volatile memory, and any combination thereof. Additionally, processor 32 and memory 34 may include and execute operating system 110 (FIG. 1).

Further, computer device 102 may include a communications component 36 that provides for establishing and maintaining communications with one or more parties utilizing hardware, software, and services as described herein. Communications component 36 may carry communications between components on computer device 102, as well as between computer device 102 and external devices, such as devices located across a communications network and/or devices serially or locally connected to computer device 102. For example, communications component 36 may include one or more buses, and may further include transmit chain components and receive chain components associated with a transmitter and receiver, respectively, operable for interfacing with external devices.

Additionally, computer device 102 may include a data store 38, which can be any suitable combination of hardware and/or software, that provides for mass storage of information, databases, and programs employed in connection with implementations described herein. For example, data store 38 may be a data repository for applications 10 (FIG. 1), haptic feedback manager 24 (FIG. 1), haptic metadata data store 30 (FIG. 1), and/or display device 108 (FIG. 1).

Computer device 102 may also include a user interface component 40 operable to receive inputs from a user of computer device 102 and further operable to generate outputs for presentation to the user. User interface component 40 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 40 may include one or more output devices, including but not limited to a display, a speaker, a haptic feedback mechanism, a printer, any other mechanism capable of presenting an output to a user, or any combination thereof.

In an implementation, user interface component 40 may transmit and/or receive messages corresponding to the operation of applications 10, haptic feedback manager 24, haptic metadata data store 30, and/or display device 108. In addition, processor 32 executes applications 10, haptic feedback manager 24, haptic metadata data store 30, and/or display device 108, and memory 34 or data store 38 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory; and
   an operating system in communication with the memory, the processor, and an application providing a virtual environment, wherein the application is operable to:
   receive physical movement input based at least on a physical movement of a haptic feedback device, wherein the physical movement corresponds to a virtual movement of the haptic feedback device to access various file folders in the virtual environment, wherein the virtual movement corresponds to a virtual interaction by the haptic feedback device with a file in one of the various file folders in the virtual environment;
   access a unique haptic signature associated with and uniquely identifying an attribute of the file that indicates whether the file is locked or whether access to the file is restricted;

determine a unique haptic response based at least upon the unique haptic signature to uniquely identify the attribute of the file through the unique haptic response; and transmit the unique haptic response to the haptic feedback device.

2. The computer device of claim 1, wherein the haptic feedback device is a haptic glove having a plurality of haptic feedback units that output the unique haptic response.

3. The computer device of claim 2, wherein the unique haptic signature provides specific feedback response to each unit of the plurality of haptic feedback units.

4. The computer device of claim 1, wherein the unique haptic signature identifies a status of the file.

5. The computer device of claim 4, wherein the status is one or more of restricted access, locked, unlocked, or restricted movement.

6. The computer device of claim 1, wherein, responsive to the attribute of the file indicating that the file is unmovable from one folder to another, the unique haptic response is configured to result in a sensation of resistance that prevents from moving the file.

7. The computer device of claim 1, wherein the unique haptic signature is further adapted to uniquely identify the file when the file is outside a field of view of a user of the computer device.

8. The computer device of claim 1, wherein the unique haptic response is further used to locate the file in the virtual environment.

9. The computer device of claim 1,
wherein the application is further operable to receive a user input assigning one or more haptic response characteristics to the unique haptic signature for the file; and
wherein determining the unique haptic response comprises determining based on at least the one or more haptic response characteristics.

10. The computer device of claim 1, wherein the file comprises a document, a video, or a photo.

11. A method comprising:
receiving, by an application providing a virtual environment executing on a computer device, physical movement input based at least on a physical movement of a haptic feedback device, wherein the physical movement corresponds to a virtual movement of the haptic feedback device to access various file folders in the virtual environment, wherein the virtual movement corresponds to a virtual interaction by the haptic feedback device with a file in one of the various file folders in the virtual environment;
accessing a unique haptic signature associated with and uniquely identifying an attribute of the file that indicates whether the file is locked or whether access to the file is restricted;
determining a unique haptic response based at least upon the unique haptic signature to uniquely identify the attribute of the file through the unique haptic response; and transmitting the unique haptic response to the haptic feedback device.

12. The method of claim 11, wherein the haptic feedback device is a haptic glove having a plurality of haptic feedback units that output the unique haptic response.

13. The method of claim 12, wherein the unique haptic signature provides specific feedback response to each unit of the plurality of haptic feedback units.

14. The method of claim 11, wherein the unique haptic signature identifies a status of the file.

15. The method of claim 14, wherein the status is one or more of restricted access, locked, unlocked, or restricted movement.

16. The method of claim 11, wherein, responsive to the attribute of the file indicating that the file is unmovable from one folder to another, the unique haptic response is configured to result in a sensation of resistance that prevents from moving the file.

17. The method of claim 11, wherein the unique haptic signature is further adapted to uniquely identify the file when the file is outside a field of view of a user of the computer device.

18. The method of claim 11, wherein the unique haptic response is further used to locate the file in the virtual environment.

19. The method of claim 11, further comprising:
receiving a user input assigning one or more haptic response characteristics to the unique haptic signature for the file; and
wherein determining the unique haptic response comprises determining based on at least the one or more haptic response characteristics.

20. A non-transitory computer-readable medium storing instructions executable by a computer device, comprising:
at least one instruction for causing the computer device to receive physical movement input based at least on a physical movement of a haptic feedback device, wherein the physical movement corresponds to a virtual movement of the haptic feedback device to access various file folders in a virtual environment, wherein the virtual movement corresponds to a virtual interaction by the haptic feedback device with a file in one of the various file folders in the virtual environment;
at least one instruction for causing the computer device to access a unique haptic signature associated with and uniquely identifying an attribute of the file that indicates whether the file is locked or whether access to the file is restricted;
at least one instruction for causing the computer device to determine a unique haptic response based at least upon the unique haptic signature to uniquely identify the attribute of the file through the unique haptic response; and
at least one instruction for causing the computer device to transmit the unique haptic response to the haptic feedback device.

* * * * *